US009159370B2

(12) United States Patent
White et al.

(10) Patent No.: US 9,159,370 B2
(45) Date of Patent: Oct. 13, 2015

(54) DISTRIBUTING MEDIA USING A PORTABLE DIGITAL DEVICE COMPATIBLE WITH OPTICAL DRIVE DEVICES

(75) Inventors: Tom White, San Francisco, CA (US); Albhy Galuten, Santa Monica, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2221 days.

(21) Appl. No.: 11/699,804

(22) Filed: Jan. 29, 2007

(65) Prior Publication Data

US 2008/0181080 A1   Jul. 31, 2008

(51) Int. Cl.
*G11B 3/00* (2006.01)
*G06F 3/06* (2006.01)
*G11B 31/00* (2006.01)
*G11B 3/64* (2006.01)
*G06F 13/10* (2006.01)

(52) U.S. Cl.
CPC ............ *G11B 31/006* (2013.01); *G06F 3/0602* (2013.01); *G06F 3/0679* (2013.01); *G11B 3/64* (2013.01); *G06F 13/102* (2013.01)

(58) Field of Classification Search
CPC ... G06F 3/0601; G06F 3/0602; G06F 3/0607; G06F 3/0679; G06F 1/1601; G06F 13/102; H04L 12/2459; H04L 41/24; H04L 67/12; H04L 67/125
USPC .................................................. 709/246–247
See application file for complete search history.

(56) References Cited

U.S. PATENT DOCUMENTS

| 5,708,650 A | 1/1998 | Nakashima et al. ........ 369/275.3 |
| 7,532,553 B2* | 5/2009 | Hanes ......................... 369/53.22 |
| 2004/0231495 A1* | 11/2004 | Huang et al. .................... 84/601 |
| 2005/0273825 A1* | 12/2005 | Eldeeb .............................. 725/81 |
| 2006/0062137 A1* | 3/2006 | Ross ........................... 369/275.1 |
| 2008/0071834 A1* | 3/2008 | Bishop ....................... 707/104.1 |

FOREIGN PATENT DOCUMENTS

| EP | 0 640 960 B1 | 8/2001 | ............... G11B 7/00 |
| WO | WO 99/49458 | 9/1999 | ............... G11B 7/00 |
| WO | WO 2004/008459 A1 | 1/2004 | ........... G11B 27/034 |
| WO | WO 2004008459 A1 * | 1/2004 | |
| WO | WO 2006/027715 A1 | 3/2006 | ............. G11B 27/10 |
| WO | WO 2006027715 A1 * | 3/2006 | |

* cited by examiner

*Primary Examiner* — Patrice Winder
(74) *Attorney, Agent, or Firm* — Haverstock & Owens LLP

(57) ABSTRACT

A media distribution system is provided in which a primary means of transport for digital media is through a device with housing shaped as an optical disc and insertable into various current and future optical disc drive devices. Media travels from different digital sources such as a personal media library and other networked resources to embedded memory on the optical disc shaped device via a capable personal computer or electronic device. This media is then able to be presented in the most appropriate format in a number of different types of current and legacy devices with optical drives such as CD audio devices and DVD players.

34 Claims, 3 Drawing Sheets

DISTRIBUTING MEDIA USING A PORTABLE DIGITAL DEVICE COMPATIBLE WITH OPTICAL DRIVE DEVICES

FIELD OF THE INVENTION

The present invention relates to the field of digital media. More specifically, the present invention relates to distributing digital media using optical discs.

BACKGROUND OF THE INVENTION

Networks enable computers to share information. Increasingly, this information is entertainment-related media such as movies, music, pictures and print. In the broad sense, a computer network includes not only physical interconnections but also transports data via physical media such as optical discs. Physical media transport is important for reaching devices that do not have access to a physical network. These include low cost or legacy devices such as consumer electronics equipment as well as mobile devices such as portable and automobile based electronics.

In order to enable mobility of digital audio and video, many commercial portable digital players have been developed. These digital media players have internal storage for holding a collection of entertainment-related media files, which allows the devices to hold a subset of the content available from a personal collection and the larger network. These devices generally operate by having the user copy the content on the device itself which is equipped with embedded screens and speakers, and do not easily interface with existing entertainment equipment without separate peripherals.

In general, the potential use of the portable media suffers since there are many environments that cannot access the media libraries on these existing devices without a separately attached peripheral. Some examples of existing inaccessible environments include a TV in the living room, speakers in the car or a legacy portable audio device. Moreover, the peripheral needed in different situations can vary widely.

SUMMARY OF THE INVENTION

A media distribution system is provided in which a primary means of transport for digital media is through a device with housing shaped as an optical disc and insertable into various current and future optical disc drive devices. Media travels from different digital sources such as a personal media library and other networked resources to embedded memory on the optical disc shaped device via a capable personal computer or electronic device. This media is then able to be presented in the most appropriate format in a number of different types of current and legacy devices with optical drives such as CD audio devices and DVD players.

In one aspect, a method of distributing digital media using an optical disc-shaped device comprises transferring data to the disc-shaped device from a first device and utilizing the data on the disc-shaped device with a second device, wherein the disc-shaped device is able to be read by a plurality of different types of devices, further wherein the disc-shaped device provides networkability to the different types of devices, so that the different types of devices are able to easily share information. The disc-shaped device has an internal set of digital media types and logical operations related to the types. The disc-shaped device presents itself to different devices as one of a family of known optical formats based on the disc-shaped device probing the capabilities of the devices the disc-shaped device is inserted into. The disc-shaped device is able to intercept low level commands sent by the first device and translate the commands into appropriate internal media types and logical operations on the types. Utilizing the data includes playing, displaying, or running the data. The first device may contain drivers related to the disc device. The first device and the second device are legacy devices. The second device is selected from the group consisting of a CD player, a gaming console, a DVD player, a portable stereo and a car stereo. The method further comprises performing a self-conversion within the disc-shaped device.

In another aspect, a method of distributing data among a first electronic device and additional electronic devices comprises inserting a disc device into the first electronic device, transferring the data from the first electronic device to the disc device, removing the disc device from the first electronic device, inserting the disc device into an additional electronic device and utilizing the data stored on the disc device with the additional electronic device, wherein the disc device is able to be read by a plurality of different types of devices, further wherein the disc device provides networkability to the different types of devices, so that the different types of devices are able to easily share information. The disc device has an internal set of digital media types and logical operations related to the types. The disc device presents itself to different devices as one of a family of known optical formats based on the optical disc-shaped device probing the capabilities of the devices the optical disc-shaped device is inserted into. The disc device is able to intercept low level commands sent by the first electronic device and translate the commands into appropriate internal media types and logical operations on the types. Utilizing the data includes playing, displaying, or running the data. The first electronic device may contain drivers related to the disc device. The first electronic device and the additional electronic devices are legacy devices. The additional electronic devices are selected from the group consisting of a CD player, a gaming console, a DVD player, a portable stereo and a car stereo. The method further comprises performing a self-conversion within the disc device. The method further comprises repeating the steps above as desired.

In yet another aspect, a system for distributing media comprises an optical disc-shaped device, a writing device for writing to the optical disc-shaped device and a reading device for reading from the optical disc-shaped device, wherein the optical disc-shaped device is able to be read by a plurality of different types of devices, further wherein the optical disc-shaped device provides networkability to the different types of devices, so that the different types of devices are able to easily share information. The optical disc-shaped device has an internal set of digital media types and logical operations related to the types. The optical disc-shaped device presents itself to different devices as one of a family of known optical formats based on the optical disc-shaped device probing the capabilities of the devices the optical disc-shaped device is inserted into. The optical disc-shaped device is able to intercept low level commands sent by the writing device and translate the commands into appropriate internal media types and logical operations on the types. The writing device may contain drivers related to the optical disc-shaped device. The writing device and the reading device are legacy devices. The reading device is selected from the group consisting of a CD player, a gaming console, a DVD player, a portable stereo and a car stereo.

In another aspect, a network of devices comprises one or more optical disc-shaped devices, one or more computing devices for writing data to the one or more optical disc-shaped devices and one or more legacy devices for utilizing the one or more optical disc-shaped devices, wherein the one or more optical disc-shaped devices are able to be read by a plurality of different types of devices, further wherein the one or more optical disc-shaped devices provide networkability to the different types of devices, so that the different types of devices are able to easily share information. The one or more optical disc-shaped devices have an internal set of digital media types and logical operations related to the types. The one or more optical disc-shaped devices present themselves to different devices as one of a family of known optical formats based on the optical disc-shaped device probing the capabilities of the devices the one or more optical disc-shaped devices are inserted into. The one or more optical disc-shaped devices are able to intercept low level commands sent by the computing device and translate the commands into appropriate internal media types and logical operations on the types. Utilizing the data includes playing, displaying, or running the data. The one or more computing devices may contain drivers related to the optical disc-shaped device. The one or more computing devices are also legacy devices. The one or more legacy devices are selected from the group consisting of a CD player, a gaming console, a DVD player, a portable stereo and a car stereo.

DETAILED DESCRIPTION OF THE PREFERRED EMBODIMENT

The present invention provides a way of distributing local and remotely accessed digital content for accessing a variety of legacy and contemporary devices through optical disc drives. The digital content is transferred from a host device onto a special portable digital device structurally and functionally compatible with a family of optical disc systems. This special portable digital device is termed a Chameleon Disc Device (CDD) referring to the fact that the device is able to appear to different devices as one of a family of different physical optical discs based on context. The CDD is able to be realized as a special rewritable optical disc with embedded flash memory. The CDD is also able to be shared across a large and growing family of devices, and in each situation the disc is able to present the content it is carrying in a context-appropriate manner.

The CDD described herein is the same as or similar to the apparatus described in U.S. patent application Ser. No. 11/222,443 filed Sep. 8, 2005 and entitled, "Method and Apparatus for Securely Recording and Storing Data for Later Retrieval," herein incorporated by reference. Where the CDD is the same as the apparatus described in the Ser. No. 11/222,443 application, the CDD includes a microprocessor, a system memory, a data memory and a power source embedded on a compact disc substrate. The CDD also includes sensors separated by a Micro-Electro-Mechanical Systems (MEMS) mirror array. The sensors receive data from a laser of a device such as a compact disc recorder to store data on the CDD. The sensors are also used to aid in determining whether the CDD is aligned sufficiently with the laser of the device. The MEMS mirror array is used to transmit data to a recorder device using mirror elements which mimic the "pits" and "lands" typically found on a standard CD. Other embodiments of the CDD are possible so long as they are able to provide the required functionality as described below.

Figure 1A:
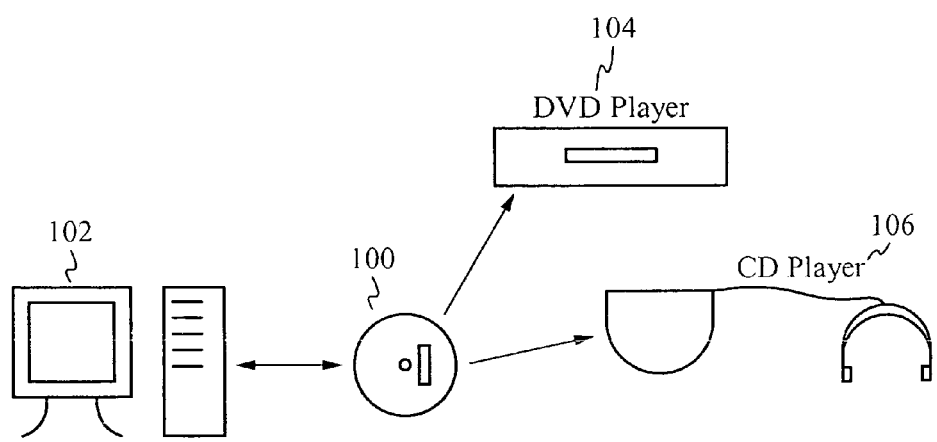
FIG. 1A illustrates a disc device being used to distribute digital media among an aware device and legacy devices.

FIG. 1A illustrates a CDD being used to distribute digital media among a CDD-aware device and legacy devices. A CDD 100 is the same size in diameter as a standard Compact Disc (CD) or Digital Versatile Disc (DVD), but unlike those discs, the CDD 100 is able to be utilized with a number of different devices. A CDD-aware device 102 is a device with the appropriate drivers and the ability to transfer digital media and information to the CDD using the appropriate protocols, such as a properly configured personal computer. When the CDD 100 is inserted within a CD and/or DVD writable drive within the CDD-aware device 102, digital media stored within the CDD-aware device 102 is transferred to the CDD 100 as specified by a user. The digital media is transferred using a program that writes data to an optical disc such as a CD or DVD burner software. After the digital media and corresponding information are transferred to the CDD 100, the CDD, 100 is then able to be utilized on other devices such as another CDD-aware device or a legacy device. A legacy device is a device which is able to read an optical disc but which is not CDD-aware, meaning the device does not have certain drivers and other abilities specific to the CDD operation. The legacy device interacts with the CDD 100 as if the CDD 100 were in a fixed optical format such as an Audio CD, DVD, CD-R, Blu-Ray Disc® and more. For example, music information is written to the CDD using a personal computer, and then the CDD is inserted into a CD player 106 which is able to play the music. The CDD presents itself as a music CD to the CD player 106 which of course is playable on the CD player 106. Later on, the same CDD is able to be used in another legacy device, such as a DVD player 104, which would recognize the CDD as a DVD. The music stored on the CDD would go to the audio channel of the DVD player 104 and any other data is able to be displayed through the video channel. By using the CDD or a plurality of CDDs, users are able to retain existing legacy devices and play current and future digital media on those legacy devices, therefore bringing the legacy devices into a networked home entertainment system. The network is generated through the use of the CDDs.

Figure 1B:
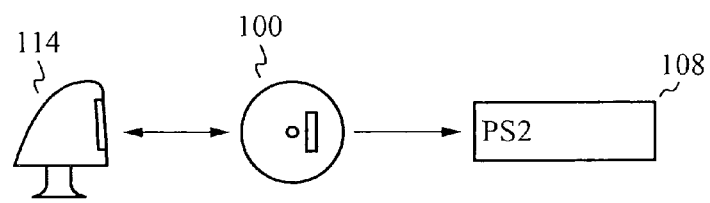
FIG. 1B illustrates a disc device being used to distribute digital media between legacy devices.

FIG. 1B illustrates a CDD being used to distribute digital media between legacy devices. Even if a computing device such as a Macintosh computer 114 does not have the appropriate software drivers, it is still able to communicate with a blank CDD. The CDD 100 presents itself to the Macintosh computer 114 as a blank recordable CD or DVD. Then, using a software utility within the Macintosh computer 114 such as iTunes, the user is able to copy data to the CDD 100. As the copying is occurring, the CDD 100 recognizes and intercepts the low level commands and saves the data in a CDD format. The CDD 100 itself is able to assume the responsibility of interpreting low-level commands into appropriate requests to access the media objects the CDD 100 contains. Afterwards, the user is able to use the CDD 100 with another legacy device such as a PlayStation gaming console 108 or a CDD-aware device.

Figure 2:
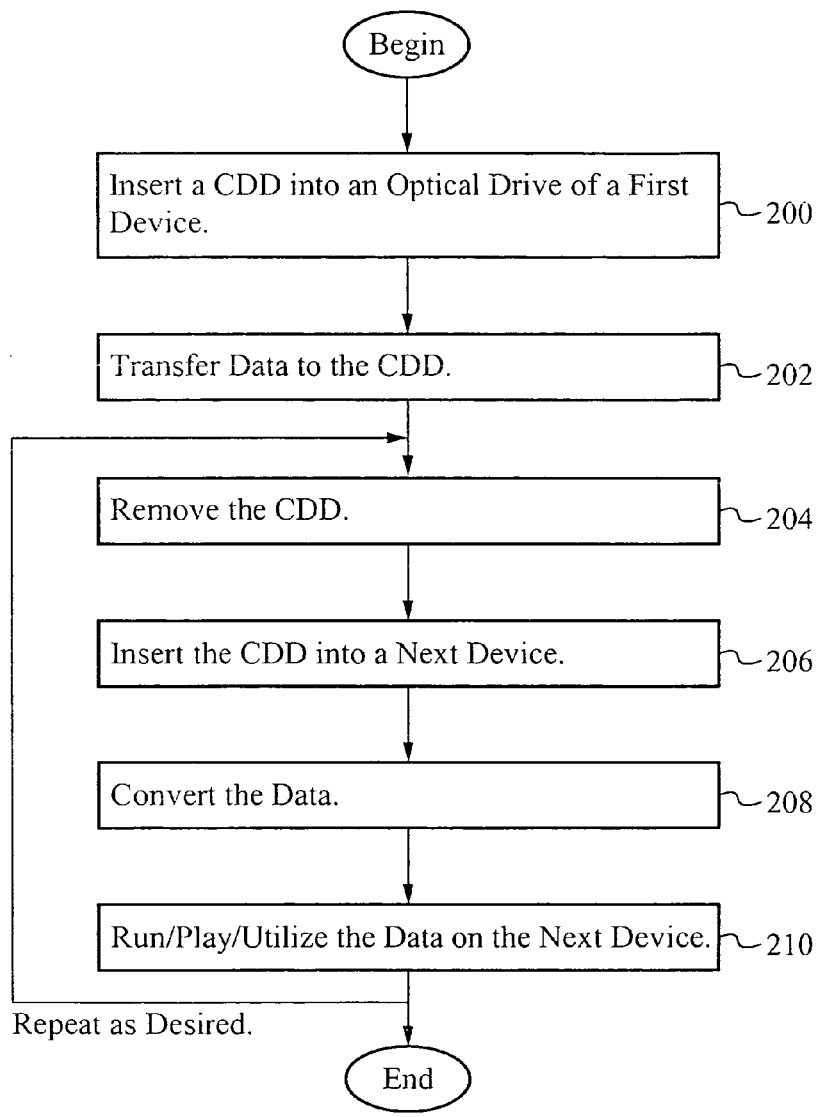
FIG. 2 illustrates a flow chart of distributing digital media among devices.

FIG. 2 illustrates a flow chart of distributing digital media among devices thereby including the devices within a network. In the step 200, a user inserts a CDD into an optical drive of a first device. As described above, the first device is able to be a CDD-aware device or a legacy device. Assuming the CDD is blank initially, the first device needs to be a device that is able to transfer a digital media to the CDD, for example a computing device which is able to copy digital media to the CDD. In the step 202, the digital media which includes, but is not limited to, data, music, movies and games, is transferred to the CDD. In the step 204, the CDD is removed from the optical drive of the first device. The CDD is then inserted into a next device, in the step 206. The next device is also able to be a CDD-aware device or a legacy device. In the step 208, the CDD converts the stored data into the appropriate format so that the next device is able to read the data. In the step 210, the next device is able to run/play/utilize the digital media on the CDD. For example, if there is music on the CDD, a CD player would play the music. The steps 204-210 are able to be repeated as desired, so that a user is able to move the CDD from device to device, providing great mobility of the digital media. In some embodiments, the digital media on the CDD is able to be edited such as deleted or added to.

Figure 3A:
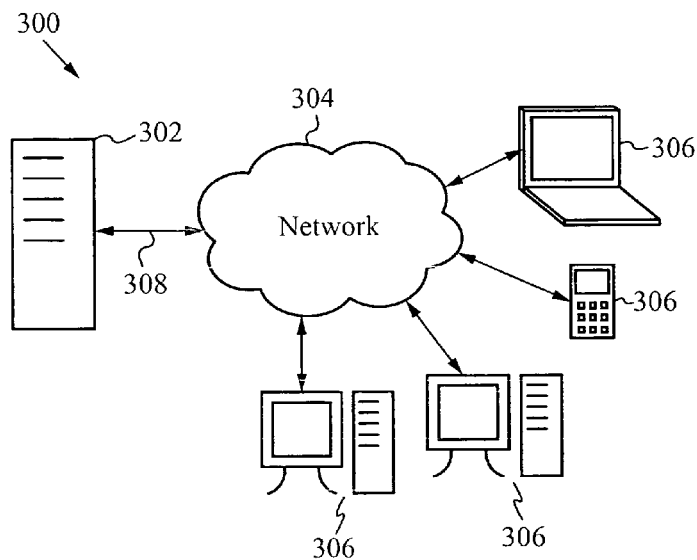
FIG. 3A illustrates a standard network of devices.

FIG. 3A illustrates a standard network of devices. In a standard network 300, a host device or server 302 stores data, typically a large amount of data. The server 302 is coupled to computing devices 306 through a network 304 with network connections 308. The computing devices 306 include devices such as a laptop, a PDA and personal computers. The server 302 is able to be selected from any of these computing devices as well. The network is any type of network including a local area network or the Internet, and the network connections are wired or wireless connections that couple the computing devices 306 and server 302 to the network 304. Through the network 304, the computing devices 306 are able to share data among themselves or with the server 302. Furthermore, the server 302 is able to store and transmit data which is able to be retrieved by the computing devices 306 through the network 304. Through the use of the network 304, data is easily transferrable between devices, so that a user is able to access the data at multiple locations. For example, using network compliant devices, a person is able to access the same music at home, at work and while mobile through a PDA. The problem with a standard network is that it requires devices to be network compliant which means that typical CD Players, DVD players, older gaming consoles, stereos, and car stereos are completely inaccessible by the network.

Figure 3B:
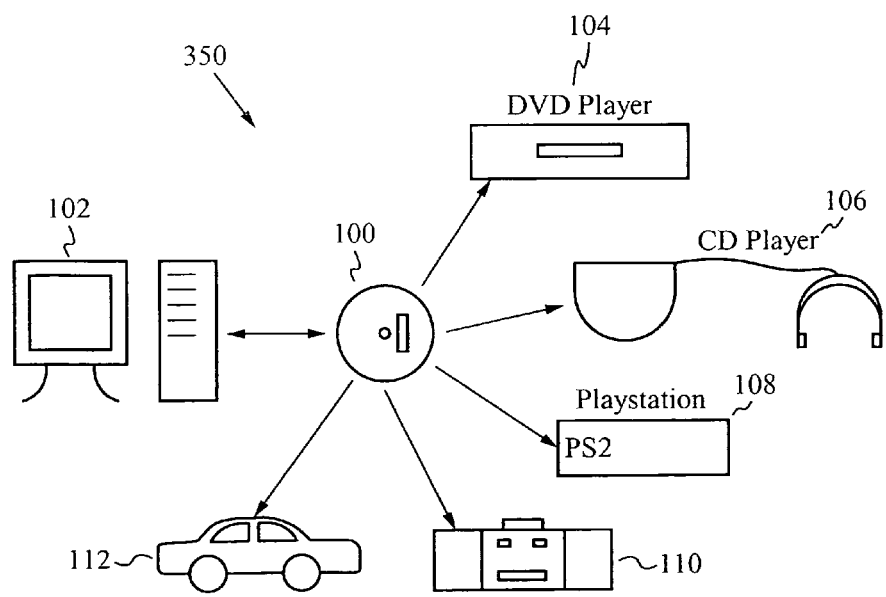
FIG. 3B illustrates a network of devices of the present invention.

FIG. 3B illustrates a network of devices using the CDD. A network of devices 350 using the CDD includes a CDD 100, a CDD-aware device 102, and legacy devices. Examples of legacy devices include, but are not limited to, a DVD player 104, a CD player 106, a PlayStation game console 108, a stereo 110 and a car stereo 112. The CDD-aware device 102 is comparable to the server 302 (FIG. 3A) where large amounts of data are able to be stored for further distribution. The CDD 100 is similar to the network 304 (FIG. 3B) and network connections 308 (FIG. 3B) in that the CDD 100 is the mechanism to distribute the data to the legacy devices which are similar to the computing devices 306 (FIG. 3B). Therefore, using the CDD 100 in the network of devices 350, the devices are able to share data as if they were in a standard network. Thus, if a user copies music from the personal computer 102 to the CDD 100, the user is then able to play the music on the CD player 106 when he goes for a walk, then in the DVD player 110 when he arrives at home and also in the car stereo 112 on his way to work. Hence, with the single CDD 100, a user is able to listen to the same music on a variety of electronic devices without having to do anything more than insert the CDD 100 into the device. Furthermore, each of the legacy devices did not need any modifications or additional features to be able to play the CDD 100. An alternative network of devices includes a CDD 100 and legacy devices without a CDD-aware device in the network. In some embodiments, multiple CDD-aware devices are part of the network of devices 350.

In operation, the present invention enables easy transfer of digital media throughout a plurality of devices. A user simply inserts the CDD into an optical drive of a computing device where data is transferred to the CDD. The data is transferred using any data transfer program, for example CD or DVD burner software. After the data transfer is completed, the CDD is able to be utilized on any device that is able to read from optical discs, as the CDD adapts the data to the device. Thus, the present invention avoids the need for physically networking devices and assists where devices are unable to be networked using a standard network, such as portable CD players.

In an example of utilizing the present invention, a user inserts a CDD into an optical drive of a personal computer with the appropriate CDD drivers stored on the personal computer. The CDD then accesses a personal MP3 library including a mix of protected and unprotected music. One or more playlists selected by the user, including the corresponding music, are transferred to the CDD. The user then removes the CDD from the personal computer and inserts it into a legacy CD player, at which time the CDD performs the conversion to present itself as a music CD. When the user presses the play button on the CD player, the transferred playlist from the personal MP3 library plays. If desired, the user is able to then remove the CDD from the CD player and insert the CDD into another device such as a DVD player. The CDD performs another conversion, this time to present itself as a DVD. The transferred playlist from the personal MP3 library plays on the DVD legacy device through the audio channel, along with metadata and other information on the visual channel. The CDD is able to be removed and used with other legacy devices as desired, as it will perform the necessary conversion each time it is introduced to a new device.

When interacting with a legacy device, the CDD presents itself as a fixed optical format. The CDD then flexibly interprets the low level commands it receives into the appropriate CDD protocols.

In another example, a CDD is inserted into an Apple Macintosh computer, which lacks the appropriate software driver and is thus considered a legacy device. Based on probing the capability of the host drive and/or external configuration information, the CDD presents itself to the Macintosh computer as a blank recordable CD-R. Using iTunes or other software on the Macintosh, a user issues commands to burn a set of songs onto the blank CD-R as a standard Red Book digital audio CD. The CDD recognizes and intercepts these low-level commands and saves the songs as a playlist in a more compact internal CDD native format. In this example, upon completion, the CDD is ejected and put into a PlayStation 2 device, at which point the CDD presents itself as a PlayStation 2 game with onscreen menus that allow the user to navigate to and play the saved playlist.

The above example demonstrates how the CDD effectively distributes media across optical drives; in this case from the Macintosh computer to the PlayStation 2 gaming console. Moreover, the example shows that CDD-aware devices are not strictly necessary for media distribution as both devices in this example are legacy devices. This is possible because the CDD itself is able to assume the responsibility of interpreting the native low-level commands into appropriate requests to access the media objects it contains.

In some embodiments the CDD is writable only once, and in other embodiments the CDD is able to be rewritten like a CDRW.

The present invention does not require additional hardware to convert the optical disc to a particular format; rather, the optical disc itself is able to adapt to different devices.

In some embodiments, when the CDD is inserted into a CDD-aware device, a user interface is presented to aid the user in configuring the data on the CDD. The user interface is able to include options on how songs are played (e.g. in order or randomly). For data, the user interface allows users to organize their data on the CDD as they choose. The user interface is able to include other features to allow users to manipulate how the digital media is stored on the CDD. The user interface is also able to allow the user to manage any other user preferences related to CDD operation, such as how the CDD should present itself to legacy devices.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of distributing digital media using an optical disc-shaped device comprising:
   a. transferring data to the disc-shaped device from a first device; and
   b. utilizing the data on the disc-shaped device with a second device,
   wherein the optical disc-shaped device contains an embedded flash memory for enabling the optical disc-shaped device to be read by a plurality of different types of devices, wherein the disc-shaped device converts the data so that the data is able to be read by a plurality of different types of devices, further wherein the disc-shaped device provides networkability to the different types of devices, so that the different types of devices are able to easily share information.

2. The method as claimed in claim 1 wherein the disc-shaped device has an internal set of digital media types and logical operations related to the types.

3. The method as claimed in claim 2 wherein the disc-shaped device presents itself to different devices as one of a family of known optical formats based on the disc-shaped device probing the capabilities of the devices the disc-shaped device is inserted into.

4. The method as claimed in claim 1 wherein the disc-shaped device is able to intercept low level commands sent by the first device and translate the commands into appropriate internal media types and logical operations on the types.

5. The method as claimed in claim 1 wherein utilizing the data includes playing, displaying, or running the data.

6. The method as claimed in claim 1 wherein the first device contains drivers related to the disc device.

7. The method as claimed in claim 1 wherein the first device and the second device are legacy devices.

8. The method as claimed in claim 1 wherein the second device is selected from the group consisting of a CD player, a gaming console, a DVD player, a portable stereo and a car stereo.

9. The method as claimed in claim 1 further comprising performing a self-conversion within the disc-shaped device.

10. A method of distributing data among a first electronic device and additional electronic devices comprising:
    a. inserting a disc device into the first electronic device;
    b. transferring the data from the first electronic device to the disc device;
    c. removing the disc device from the first electronic device;
    d. inserting the disc device into an additional electronic device; and
    e. utilizing the data stored on the disc device with the additional electronic device,
    wherein the disc device contains an embedded flash memory for enabling the disc device to be read by a plurality of different types of devices, wherein the disc device converts the data so that the data is able to be read by a plurality of different types of devices, further wherein the disc device provides networkability to the different types of devices, so that the different types of devices are able to easily share information.

11. The method as claimed in claim 10 wherein the disc device has an internal set of digital media types and logical operations related to the types.

12. The method as claimed in claim 11 wherein the disc device presents itself to different devices as one of a family of known optical formats based on the optical disc-shaped device probing the capabilities of the devices the optical disc-shaped device is inserted into.

13. The method as claimed in claim 10 wherein the disc device is able to intercept low level commands sent by the first electronic device and translate the commands into appropriate internal media types and logical operations on the types.

14. The method as claimed in claim 10 wherein utilizing the data includes playing, displaying, or running the data.

15. The method as claimed in claim 10 wherein the first electronic device contains drivers related to the disc device.

16. The method as claimed in claim 10 wherein the first electronic device and the additional electronic devices are legacy devices.

17. The method as claimed in claim 10 wherein the additional electronic devices are selected from the group consisting of a CD player, a gaming console, a DVD player, a portable stereo and a car stereo.

18. The method as claimed in claim 10 further comprising performing a self-conversion within the disc device.

19. The method as claimed in claim 10 further comprising repeating the steps c-e as desired.

20. A system for distributing media comprising:
    a. an optical disc-shaped device;
    b. a writing device for writing to the optical disc-shaped device; and
    c. a reading device for reading from the optical disc-shaped device,
    wherein the optical disc-shaped device contains an embedded flash memory for enabling the optical disc-shaped device to be read by a plurality of different types of devices, wherein the optical disc-shaped device converts the data so that the data is able to be read by a plurality of different types of devices, further wherein the optical disc-shaped device provides networkability to the different types of devices, so that the different types of devices are able to easily share information.

21. The system as claimed in claim 20 wherein the optical disc-shaped device has an internal set of digital media types and logical operations related to the types.

22. The system as claimed in claim 21 wherein the optical disc-shaped device presents itself to different devices as one of a family of known optical formats based on the optical disc-shaped device probing the capabilities of the devices the optical disc-shaped device is inserted into.

23. The system as claimed in claim 20 wherein the optical disc-shaped device is able to intercept low level commands sent by the writing device and translate the commands into appropriate internal media types and logical operations on the types.

24. The system as claimed in claim 20 wherein the writing device contains drivers related to the optical disc-shaped device.

25. The system as claimed in claim 20 wherein the writing device and the reading device are legacy devices.

26. The system as claimed in claim 20 wherein the reading device is selected from the group consisting of a CD player, a gaming console, a DVD player, a portable stereo and a car stereo.

27. A network of devices comprising:
a. one or more optical disc-shaped devices;
b. one or more computing devices for writing data to the one or more optical disc-shaped devices; and
c. one or more legacy devices for utilizing the one or more optical disc-shaped devices,
wherein the one or more optical disc-shaped devices each contain an embedded flash memory for enabling the disc-shaped devices to be read by a plurality of different types of devices, further wherein the one or more optical disc-shaped devices provide networkability to the different types of devices, so that the different types of devices are able to easily share information, wherein the one or more optical disc-shaped devices each perform a conversion each time the one or more optical disc-shaped devices are introduced to a new device, wherein the one or more optical disc-shaped devices are presented as a fixed optical format when interacting with the one or more legacy devices and flexibly interpret low level commands into appropriate protocols.

28. The network of devices as claimed in claim 27 wherein the one or more optical disc-shaped devices have an internal set of digital media types and logical operations related to the types.

29. The network of devices as claimed in claim 28 wherein the one or more optical disc-shaped devices present themselves to different devices as one of a family of known optical formats based on the optical disc-shaped device probing the capabilities of the devices the one or more optical disc-shaped devices are inserted into.

30. The network of devices as claimed in claim 27 wherein the one or more optical disc-shaped devices are able to intercept low level commands sent by the computing device and translate the commands into appropriate internal media types and logical operations on the types.

31. The network of devices as claimed in claim 27 wherein utilizing the data includes playing, displaying, or running the data.

32. The network of devices as claimed in claim 27 wherein the one or more computing devices contain drivers related to the optical disc-shaped device.

33. The network of devices as claimed in claim 27 wherein the one or more computing devices are also legacy devices.

34. The network of devices as claimed in claim 27 wherein the one or more legacy devices are selected from the group consisting of a CD player, a gaming console, a DVD player, a portable stereo and a car stereo.

\* \* \* \* \*